US012660875B2

(12) United States Patent
Josephs et al.

(10) Patent No.: US 12,660,875 B2
(45) Date of Patent: Jun. 23, 2026

(54) BALLOON GARLAND ASSEMBLY AND BALLOON ASSEMBLIES THEREFOR

(71) Applicant: Totali EZ Balloons, LLC, Scottsdale, AZ (US)

(72) Inventors: Erik Josephs, Scottsdale, AZ (US); Craig Ovans, Chandler, AZ (US)

(73) Assignee: Totali EZ Balloons, LLC, Scottsdale, AZ (US)

( * ) Notice: Subject to any disclaimer, the term of this patent is extended or adjusted under 35 U.S.C. 154(b) by 135 days.

(21) Appl. No.: 18/915,906

(22) Filed: Oct. 15, 2024

(65) Prior Publication Data

US 2025/0031791 A1      Jan. 30, 2025

Related U.S. Application Data

(63) Continuation-in-part of application No. 18/526,130, filed on Dec. 1, 2023, now abandoned.

(60) Provisional application No. 63/429,289, filed on Dec. 1, 2022.

(51) Int. Cl.
      F16K 15/20          (2006.01)
      A41G 1/04           (2006.01)
      A63H 27/10          (2006.01)
(52) U.S. Cl.
      CPC .............. A41G 1/04 (2013.01); F16K 15/20 (2013.01); *A63H 2027/1041* (2013.01); *A63H 2027/1083* (2013.01)
(58) Field of Classification Search
      CPC .... A63H 2027/1041; A63H 2027/1083; A41G 1/04; B60C 29/00
      See application file for complete search history.

(56) References Cited

U.S. PATENT DOCUMENTS

| | | | | | |
|---|---|---|---|---|---|
| 1,137,385 | A | * | 4/1915 | Creque | A63H 27/10 |
| | | | | | 251/223 |
| 2,792,669 | A | * | 5/1957 | Jackson | A63H 27/10 |
| | | | | | 446/224 |
| 4,034,501 | A | * | 7/1977 | Zeyra | A63H 27/10 |
| | | | | | 446/224 |

(Continued)

FOREIGN PATENT DOCUMENTS

| | | | | | |
|---|---|---|---|---|---|
| EP | 1927386 | A1 | * | 6/2008 | A63H 27/10 |
| GB | 2047850 | A | * | 12/1980 | B64B 1/58 |

(Continued)

*Primary Examiner* — Eugene L Kim
*Assistant Examiner* — Alyssa M Hylinski
(74) *Attorney, Agent, or Firm* — Galvani Smith PLLC; Thomas W. Galvani

(57)          ABSTRACT

A balloon assembly includes a balloon having a body, a port having only a single inlet for passage of gas into the body of the balloon, and a valve assembly including an upper valve body and a separate lower valve body cooperating to define an interior. A valve member is disposed in the interior which moves from a first position to a second position in response to the passage of air through the valve assembly from the single inlet of the port to the balloon. In the first position, the valve member is against the lower valve body, disabling the passage of air through the valve assembly from the balloon to the port. In the second position, the valve member is away from the lower valve body, enabling the passage of air through the valve assembly from the single inlet to the balloon.

19 Claims, 13 Drawing Sheets

(56)                  References Cited

U.S. PATENT DOCUMENTS

| 4,586,910 | A | * | 5/1986 | Buchanan | A63H 27/10 |
| | | | | | 446/224 |
| 4,681,138 | A | * | 7/1987 | Giuliani | F16K 15/063 |
| | | | | | 137/538 |
| 4,701,148 | A | * | 10/1987 | Cotey | A63H 27/10 |
| | | | | | 137/853 |
| 4,911,674 | A | * | 3/1990 | Cole | A63H 27/10 |
| | | | | | 137/853 |
| 5,127,867 | A | * | 7/1992 | Lau | G09F 19/008 |
| | | | | | 446/221 |
| 5,496,203 | A | * | 3/1996 | Murray | A63H 27/10 |
| | | | | | 446/224 |
| 6,408,902 | B1 | * | 6/2002 | Liau | A63H 27/10 |
| | | | | | 141/105 |
| 6,634,133 | B1 | * | 10/2003 | Levandowski | A01M 31/06 |
| | | | | | 43/2 |
| 6,790,120 | B1 | * | 9/2004 | Murray | A63H 27/10 |
| | | | | | 446/220 |
| 6,814,644 | B2 | * | 11/2004 | Nelson | A63H 27/10 |
| | | | | | 446/224 |
| 9,731,213 | B2 | * | 8/2017 | Laden | A63H 27/10 |
| 9,957,707 | B1 | * | 5/2018 | Cooper, Jr. | F21S 4/20 |
| 10,639,560 | B2 | * | 5/2020 | Mowbray | A63H 27/10 |
| 10,814,239 | B1 | * | 10/2020 | Allard | A63H 27/10 |
| 11,077,383 | B2 | * | 8/2021 | Chang | A63H 27/10 |
| 2004/0198150 | A1 | | 10/2004 | Nelson et al. | |
| 2006/0166594 | A1 | * | 7/2006 | Nelson | F16K 15/142 |
| | | | | | 446/224 |
| 2012/0289120 | A1 | * | 11/2012 | Nelson | A63H 27/10 |
| | | | | | 446/224 |
| 2017/0128850 | A1 | | 5/2017 | Wicken et al. | |
| 2017/0319976 | A1 | * | 11/2017 | Nelson | A63H 27/10 |
| 2019/0323618 | A1 | | 10/2019 | Fletcher et al. | |

FOREIGN PATENT DOCUMENTS

| GB | 2363634 | A | * | 1/2002 | A63H 27/10 |
| WO | WO-2017175223 | A1 | * | 10/2017 | F16K 15/147 |
| WO | WO-2018218493 | A1 | * | 12/2018 | F16K 15/20 |
| WO | WO-2020156315 | A1 | * | 8/2020 | F16L 41/03 |
| WO | WO-2021012806 | A1 | * | 1/2021 | F16K 15/20 |

* cited by examiner

BALLOON GARLAND ASSEMBLY AND BALLOON ASSEMBLIES THEREFOR

CROSS-REFERENCE TO RELATED APPLICATIONS

This application is a continuation-in-part of and claims the benefit of U.S. patent application Ser. No. 18/526,130, filed Dec. 1, 2023, which claims the benefit of U.S. Provisional Application No. 63/429,289, filed Dec. 1, 2022, both of which are hereby incorporated by reference in their entireties.

FIELD

The present specification relates generally to decorations, and more particularly to balloon garland decorations.

BACKGROUND

Balloon garlands are large structures formed of balloons. These decorative pieces are used at celebrations and are often arranged in the shape of an arch. The arches may be narrow, tall, wide, or short, or they may curved or squared or have some other shape. Sometimes the garlands are linearly arranged or assume another shape as desired and designed by the decorator.

Balloon garlands mimic the appearance of a flower garland but present a festive aesthetic with colored balloons. Like flower garlands, balloon garlands usually present a full, dense appearance by using a huge number of balloons. It is not unusual for a garland to require one hundred balloons or more. Designs often incorporate balloons of different sizes, colors, and even shapes.

There are a few conventional ways to create a balloon garland. One method involves tying balloons onto a single long piece of cord or flexible line. In another method, the loose necks of the balloons, beyond the knots, are sewn together in a series. In yet another method, balloons are attached to a balloon decorating strip, which is a long tacky length of tape to which balloons can be stuck and held in place.

Regardless of how they are constructed, balloon garlands always require an enormous amount of work to create and set up. Even the smallest ones can take three or four hours. Inflating the balloons takes a long time, as does arranging and attaching them together in a cohesive display. Balloons pop and have to be replaced during set up. If the decorator is also the party host, setting up the balloon garland can exhaust him or her long before the party even begins. A system or method for creating balloon garlands quickly and easily is needed.

SUMMARY

In an embodiment, a balloon garland assembly includes a frame assembly having a strut and a connector. A socket is formed in the strut, the socket including an aperture formed through the strut and a gasket fit in the aperture. A balloon assembly is fit into the gasket, the balloon assembly including a balloon, an expander in a neck of the balloon, and a stem extending out from the expander away from the balloon. The stem is configured to fit into the gasket with a gas-impermeable fit.

In embodiments, the expander includes a disc-shaped body with an outer sidewall, and a bore extending centrally through the body, wherein the stem is fit into the bore. The outer sidewall is sealed to an inner surface of the neck of the balloon. The stem includes a one-way valve. The gasket includes an outer head disposed outside the strut, an inner butt disposed inside the strut, and a body extending between the outer head and inner butt. The body of the gasket has a smaller diameter than both the outer head and the inner butt. The stem flares outward from a base, fit into the expander, to a nozzle, fit into the gasket. The nozzle includes a radially-projecting lip. The nozzle has a cross-sectional shape of one of a rectangle, square, oval, circle, triangle, pentagon, hexagon, heptagon, nonagon, decagon, and star. The strut, connector, and socket are coupled in gaseous communication. The stem is rigid.

In an embodiment, a balloon assembly includes a balloon having a body and a neck, and an expander in the neck, urging the neck radially outward, wherein the expander has a disc-shaped body with a diameter, a central bore, and an outer sidewall. A stem is fit into the central bore and extends out from the expander and away from the balloon.

In embodiments, the outer sidewall is sealed to an inner surface of the neck. The outer sidewall has a height which is approximately one-third the diameter of the expander. The stem is rigid. The stem includes a one-way valve. The stem flares outward from a base, fit into the expander, to a nozzle, fit into the gasket. The nozzle includes a radially-projecting lip. The nozzle has a cross-sectional shape of one of a rectangle, square, oval, circle, triangle, pentagon, hexagon, heptagon, nonagon, decagon, and star.

In an embodiment, a balloon assembly includes a balloon having a body and a neck. A rigid expander is in the neck of the balloon, urging the neck radially outward, wherein the expander has a disc-shaped body with a diameter, a central bore, and an outer sidewall. A rigid stem is fit into the central bore and extending out from the expander and away from the balloon, wherein the stem includes a one-way valve enabling the admission of gas into the balloon body through the stem and disabling the emission of gas from the balloon body through the stem.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Figure 1A:
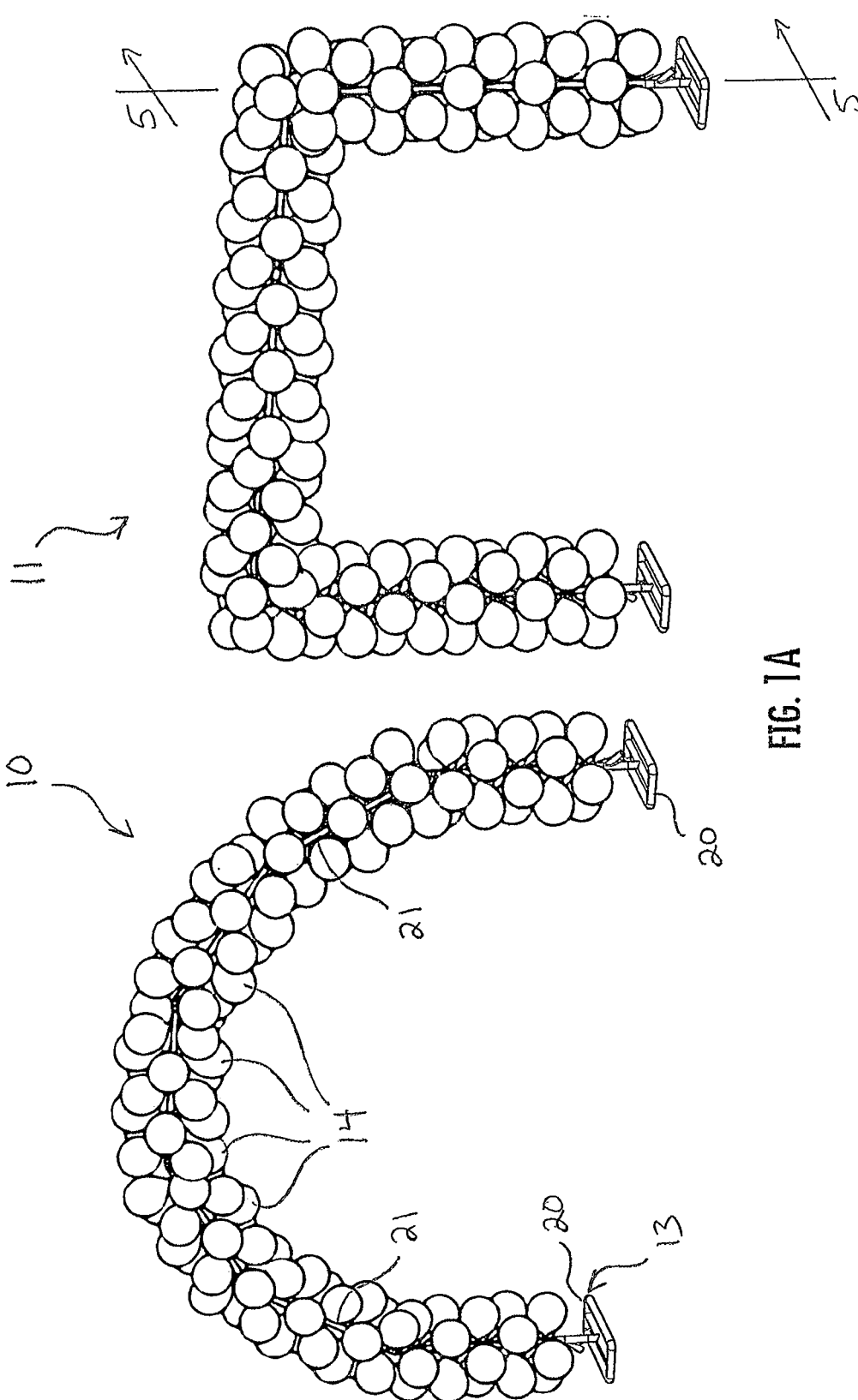
FIG. 1A is a front perspective view of two balloon garland assemblies.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather to and than delineate limit the specification; therefore, the and scope spirit of the specification should not be limited by the following description and its language choices.

FIG. 1A illustrates two exemplary embodiments of balloon garland assemblies. On the left in the drawing, a balloon garland assembly 10 (hereinafter, the "assembly 10") has an arched or arcuate shape. On the right, a balloon garland assembly 11 (hereinafter, the "assembly 11") has a squared or rectangular shape. Most of the structural elements and features of these two assemblies 10 and 11 are identical, though some are only similar. The description herein refers primarily to the assembly 10, though it is equally applicable to the assembly 11 except as specifically noted. The assemblies 10 and 11 are merely exemplary assemblies, and other shapes and configurations are within the scope of this disclosure. Such configurations include, without limitation, a vertical linear arrangement, a horizontal linear arrangement, a triangular arrangement, a circular arrangement, a star arrangement, arrangement, a plane arrangement, a hat arrangement, a flower arrangement, and the like.

The assembly 10 is constructed from a number of constituent structural elements. Those elements are modular and can be combined and arranged in different combinations to build garlands of different sizes and shapes. The assembly 10 can carry dozens or hundreds of balloons, depending on the design arrangement.

Figure 1B:
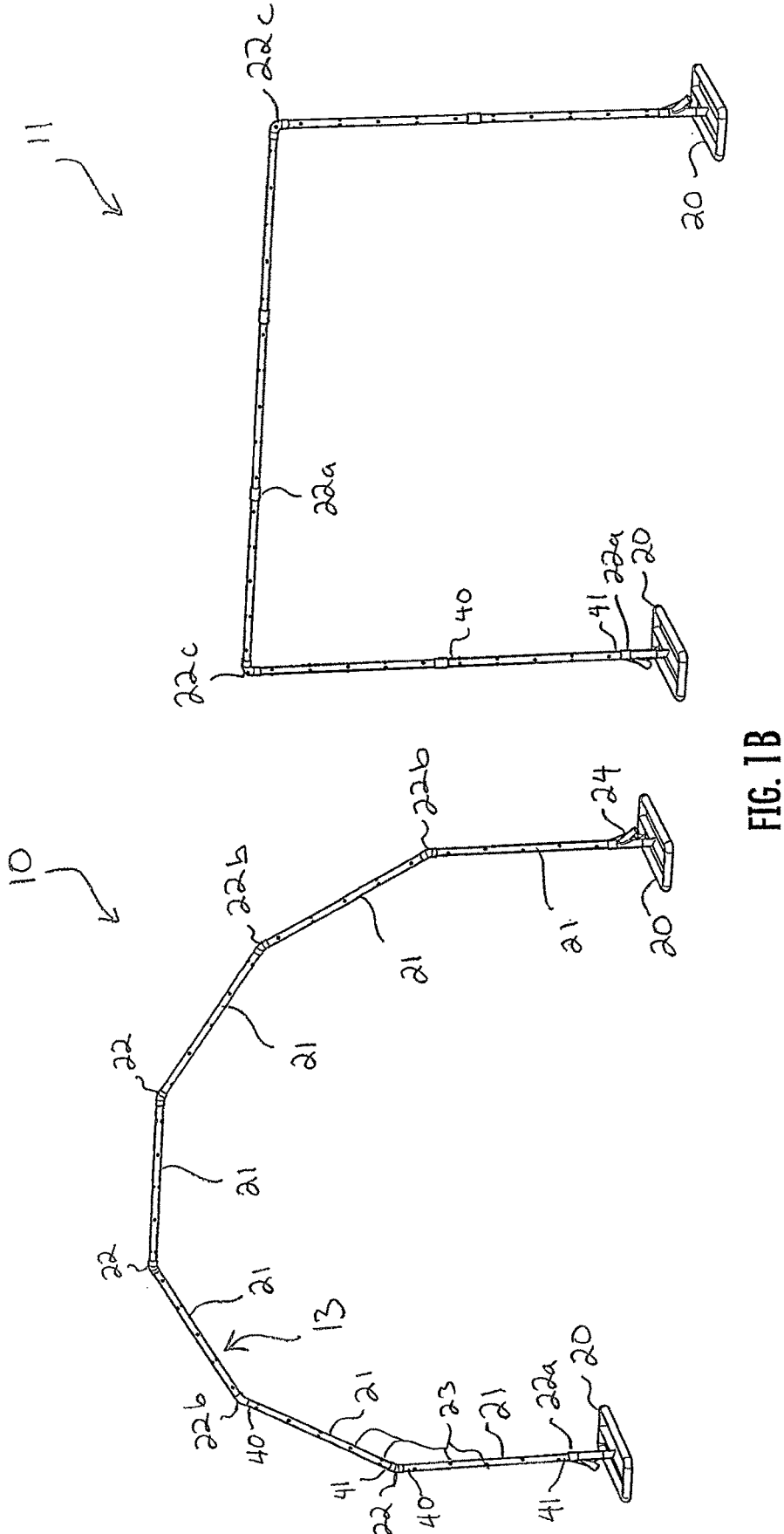
FIG. 1B is a front perspective view of the balloon garland assemblies of FIG. 1A, with the balloons removed so that the frame assemblies are visible.

The assembly 10 includes a frame assembly 13 covered with a large plurality of balloon assemblies 14. FIG. 1B shows both assemblies 10 with the balloon assemblies 14 removed. Referring now to both FIGS. 1A and 1B, the frame assembly 13 includes two bases 20, elongate legs or struts 21 extending upward from and between the bases 20, and connectors 22 coupling adjacent struts 21. When assembled in a desired arrangement as shown in FIG. 1A, the bases 20, struts 21, and connectors 22 form a continuous, contained system of pipes coupled to each other in gaseous communication. Each of these pieces is preferably hollow, such that when they are connected together, air, helium, or another gas may move through the frame assembly 13 without interruption or blockage. In other words, a gas introduced to one end of the frame assembly 11 communicates through the entire frame assembly 11 to an opposed, far end of the assembly 10.

The balloon assemblies 14 are coupled to the struts 21 in gaseous communication. Sockets 23 in the struts 21 allow the balloon assemblies 14 to tightly couple with the struts 21 so that the gas introduced to one end of the frame assembly 11 will not only communicate through the entire frame assembly 11 but will enter each balloon assembly 14 connected to the struts 21, so that the balloon assemblies 14 inflate with that gas. A decorator who has coupled hundreds of balloon assemblies 14 to the frame assembly 13 can create a large, beautiful balloon garland assembly in very little time.

Figure 2:
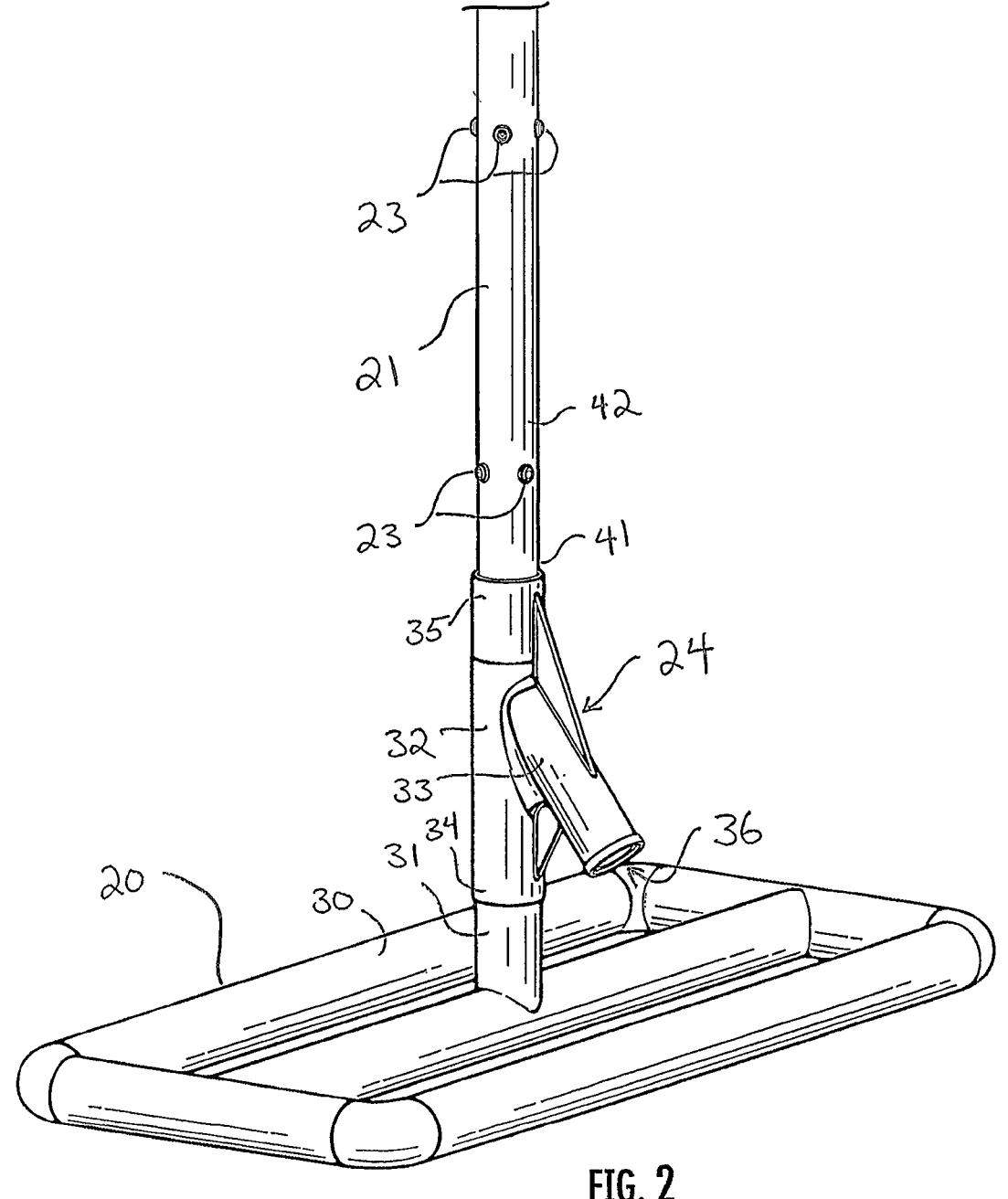
FIG. 2 is an enlarged perspective view of a base of balloon garland assembly of FIG. 1B.

Turning now to FIG. 2, one of the bases 20 and a strut 21 are shown, coupled by an intake connector 24. The base 20 has a wide, low body 30 with an upstanding post 31 located centrally with respect to the body 30. The body 30 shown here is a framework, an assembly of several tubes. In other embodiments, the base 20 has a wide, low, truncated conical body with a flat bottom, a flat top, and a conical sidewall extending from the bottom to the top, and in other embodiments it may have some other form. The body 30 of the base 20 is preferably low so that a heavy sack or other weight can be placed on top of the base 20 to support the frame assembly 13 in the wind. The post 31 of the base 20 is cylindrical, integral, and unitary to the base 20. The post 31 has an outer diameter defining a mounting post for the intake connector 24.

The intake connector 24 has a main tubular body 32 and a port 33 extending from the body 32. The body 32 has a lower end 34 and an opposing upper end 35. At the lower end 34, the body 32 has an inner diameter which corresponds to the outer diameter of the post 31, such that when coupled, the two fit together in tight, air-impermeable engagement.

The port 33 is a hollow cylinder extending outwardly from the body 32 and diagonally downward toward the lower end 34 of the body 32. The port 33 terminates in a mouth or inlet 36. The inlet 36 is an entrance to the hollow port 33, which in turn is joined in gaseous communication with the body 32 of the intake connector 24. At the upper end 35, the body 32 has an inner diameter which corresponds to the outer diameter of the strut 21, such that when coupled, the two fit together in tight, air-impermeable engagement. Gas can thus flow through the inlet 36, through the port 33, up the body 32, and into the strut 21.

The struts 21 are preferably identical. As such, the structural elements and features of only one strut 21 are described here, with the understanding that the description applies to all struts 21 unless otherwise noted. The struts 21 are modular and fungible: each can be used in place of the other, and each can be used anywhere in the frame assembly 11 as desired by the decorator. FIG. 2 shows a strut 21 applied in the intake connector 24. FIG. 1B shows several struts 21 coupled together with connectors 24.

Figure 4:
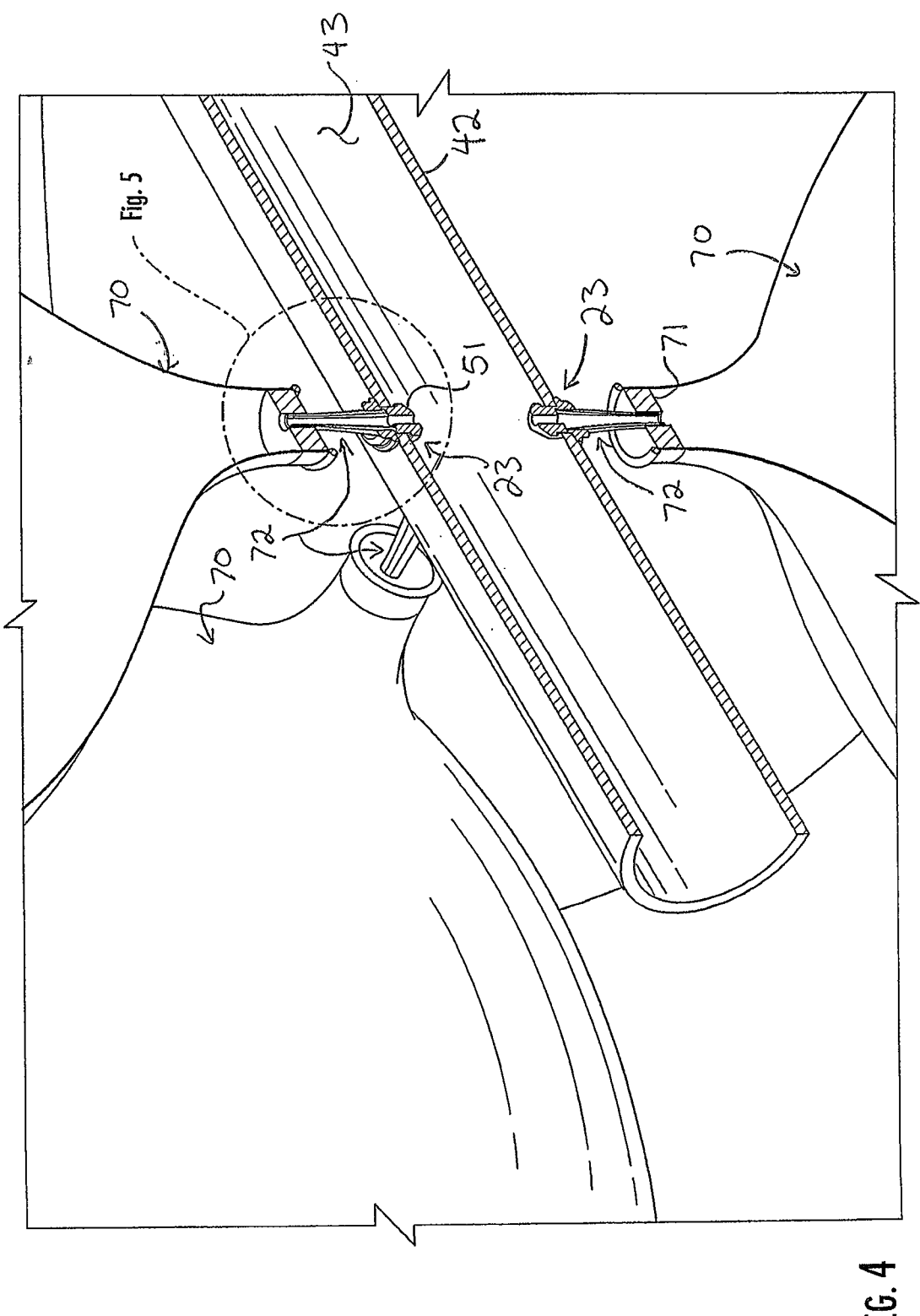
FIG. 4 is a partial section view taken along the line 5-5 from FIG. 1A.

As shown in FIG. 1B, each strut 21 has a first or upper end 40 and an opposed second or lower end 41. The reader will understand that "upper" and "lower" are used here only for purposes of ease of identification and simplicity and that such naming conventions are not limiting. The strut 21 has a cylindrical sidewall 42 extending between the upper and lower ends 40 and 41. In other embodiments, the sidewall 42 may be square, rectangular, or have another cross-sectional shape. In other embodiments, the strut 21 has different lengths, too, and may even curvature or some shape other than straight. The sidewall 42 defines a continuous, hollow, elongate interior 43 (shown in FIGS. 4 and 5) which is enclosed except at the upper and lower ends 40 and 41 and at the sockets 23. As such, gas introduced at either end 40 or 41 can transmit through the strut 21 to the other end 41 or 40.

The struts 21 are coupled together with the connectors 22. The connectors 22 allow communication of gas between adjacent struts 21 and rigidly arrange adjacent struts 21 with respect to each other. There are many types of connectors 22, with three types shown in FIG. 1B.

Each connector 22 is a short cylindrical hollow stub. Each connector 22 has a cylindrical sidewall terminating in opposed open ends. The inner diameter of the connector 22 corresponds closely to the outer diameters of the struts 21 such that each strut 21 engages with the connector 22 in a tight, air-impermeable engagement. Moreover, the connector 22 is a rigid body, and connecting two adjacent struts 21 with a connector 22 ensures that the struts 21 are registered, aligned, and held and maintained in alignment and registration as desired.

One type of connector 22 is a coupling or straight connector 22a. Straight connectors 22a are shown in both assemblies 10 and 11 of FIG. 1B. It is straight. The straight connector 22a has opposed ends which are circular, coextensive, and coaxial with each other. The ends define open mouths which share a common central axis, because the ends are parallel to each other. Each of these connectors 22a forms a one-hundred-eighty degree angle between the adjacent struts 21 coupled thereto.

Another type of connector 22 is an obtuse elbow connector 22b. Obtuse elbow connectors 22b are shown only in the assembly 10 of FIG. 1B, not in the assembly 11. The obtuse elbow connector 22b has opposed ends which are circular and coextensive but are not coaxial. Rather, the ends define open mouths, each of which has an axis that is transverse to the axis of the other. The two axes of these mouths intersect to form an obtuse angle. Each of these connectors 22b forms an obtuse angle between the adjacent struts 21 coupled thereto.

Another type of connector 22 is a ninety elbow connector 22c. Ninety elbow connectors 22c are shown only in the assembly 11 of FIG. 1B and not in the assembly 10. Each of these connectors 22c forms a ninety-degree angle between the adjacent struts 21 coupled thereto. The ninety-degree connector 22c has opposed ends which are circular and coextensive but are not coaxial. Rather, the ends define open mouths, each of which has an axis that is set at a ninety-degree angle with respect to the axis of the other. Each of these connectors 22c forms a ninety-degree angle between the adjacent struts 21 coupled thereto.

Another type of connector 22 is an acute elbow connector. The drawings do not show an acute elbow connector, but it is similar to the obtuse elbow connector 22b except that the angle formed between the two coupled adjacent struts is acute, not obtuse. Another type of connector 22 is a tee connector, coupling three struts 21 at a single point. Another type of connector 22 is a cross connector, coupling four struts 21 at a single point. Other types of connectors 22 coupling two or more struts 21 in different configurations are considered within the scope of this disclosure.

When coupled with connectors 22 and to the bases 20, the struts 21 form the frame assembly 13, capable of conveying gas throughout the frame assembly 13 to the sockets 23. The struts 21 are carried all along the struts 21 and allow the balloon assemblies 14 to be attached to the frame assembly 13 and quickly inflated.

As seen in FIG. 2, there are several sockets 23 spaced apart along a strut 21. Three sockets 23 are visible at the top of the drawing, and two sockets 23 are visible below. The three sockets 23 above form a set, because they are registered with each other in a plane cutting through the strut 21, and the two sockets 23 below form a set, because they are registered with each other in another plane cutting through the strut 21. In this embodiment, each set of sockets 23 is rotationally offset with respect to an adjacent set of sockets 23, such that the sockets 23 of one set point in different radial directions than do the sockets 23 of an adjacent set of sockets 23. In other embodiments, the sockets 23 are not rotationally offset with respect to each other. Moreover, in other embodiments, the sockets 23 are arranged in different patterns. For instance, there may be a lesser or greater number of sockets in a set. The spacing between sockets 23 in a set may be smaller, larger, or varied. The sockets 23 may be arranged in patterns across the strut 21 outside of sets, such as in a helical pattern or some other pattern. The sets may be more densely or more widely spread apart than as shown in the drawings. And, in other embodiments, the sockets 23 are also in the connectors 23, to help create a fuller display of balloons on the assembly 10.

Figure 5:
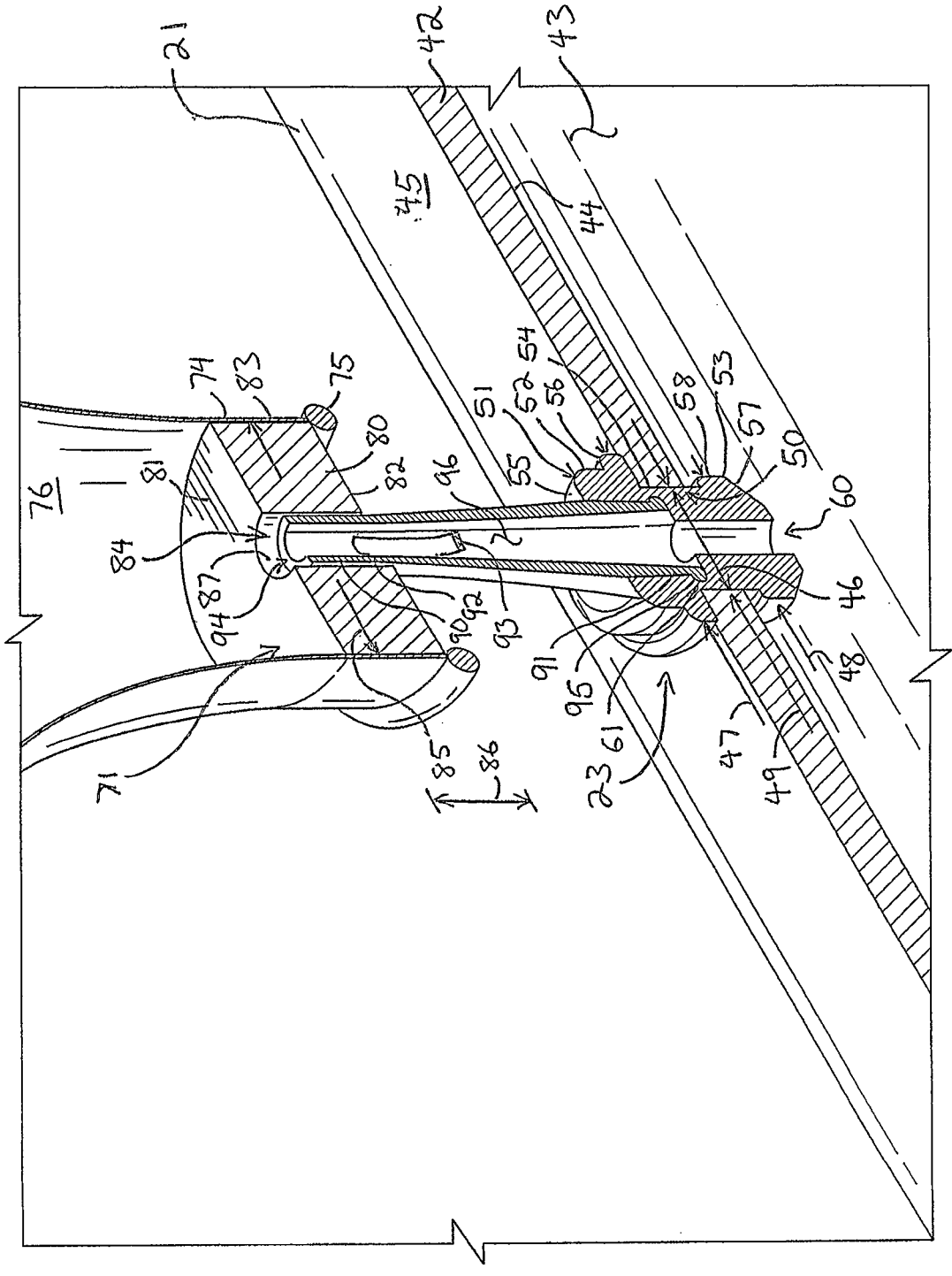
FIG. 5 is an enlarged section view taken along the line 5-5.

Each socket 23 is identical to the other but for location and orientation, and so the following description applies to all sockets 23. Turning to FIG. 5, which is an enlarged view of one of the struts 21 taken along the line 5-5 in FIG. 1B. The socket 23 includes an aperture 50 and a gasket 51 fit into the aperture 50.

The aperture 50 is a bore or through-hole formed entirely through the sidewall 42 of the strut 21. It is preferably, but not necessarily, circular in cross-section. The aperture 50 defines an inner diameter 46.

The gasket 51 is fit into the aperture 50 with a tight, gas-impermeable fit. The gasket 51 includes an outer head 52, an opposed inner butt 53, and a body 54 extending between and connecting the head 52 and butt 53. The head 52 includes a cap 55 and a flange 56 below the cap 55. Both the cap 55 and flange 56 are annular, with the flange 56 having a larger diameter 47 than the cap 55. In other words, the flange 56 extends radially outward further than the cap 55. The outer diameters of both the cap 55 and the flange 56 are larger than the inner diameter 46 of the aperture 50, such that the head 52 cannot fit through the aperture 50. Rather, the head overlies an outer surface 44 of the strut 21 immediately surrounding the aperture 50.

The butt 53 of the gasket 51 opposes the head 52. The butt 53 is disposed against an inner surface 45 of the strut 21, and the body 54 pulls the head 52 and butt 53 toward each other against the outer and inner surfaces 44 and 45, respectively. The butt 53 has a taper with an annular outer end 57 which is narrower in diameter than an annular inner end 58 and which tapers from the outer end 57 to the inner end 58. The diameter of the inner end 58 is marked with the reference character 48 in FIG. 5. The outer diameters of both the outer and inner ends 57 and 58 are bigger than the inner diameter 46 of the aperture 50, such that the butt 53 cannot fit through the aperture 50.

The body 54 of the gasket 51 is cylindrical and more slender than the head 52 and the butt 53. The body 54 has an outer diameter 49 which is just slightly larger than the inner diameter 46 of the aperture 50. The body 54 joins the head 52 and butt 53 integrally as a single, monolithic piece.

Indeed, the gasket 51 is a unitary piece, constructed from a material or combination of materials having durable and resilient material characteristics, such as rubber. When installed into the aperture 50, the gasket 51 is both compressed and stretched. The outer diameter 49 of the body 54, which is just larger than the inner diameter 46 of the aperture 50 in a neutral, uncompressed state, becomes compressed when applied to the aperture 50, acting to seal the sidewall of the body 54 against the inner wall of the aperture 50. Moreover, when the gasket 51 is installed in the aperture, the body 54 lengthens. Out of the aperture and under no force, the body 54 has a length between the head 52 and the butt 53 which is just less than the thickness of the sidewall 42. As such, when the gasket 51 is applied to the aperture 50 and the head 52 is disposed against the outer surface 44 and the butt 53 is disposed against the inner surface 45, the body stretches and lengthens to match the thickness of the sidewall 42. Because the gasket 51 is resilient, however, the body 54 pulls the head 52 and butt 53 inward and toward each other, acting to seal the head 52 against the outer surface 44 and the butt 53 against the inner surface 45. In these ways, the gasket 51 forms an air-impermeable fit with the aperture 50.

The gasket 51 includes a bore 60 extending centrally through the gasket 51 from the head 52 to the butt 53. The bore 60 is a path for the transmission of gas from one side of the gasket 51 to the other. The bore 60 has an annular channel 61 extending radially outward from the bore 60 and into the gasket 51 itself. The channel 61 is round and extends entirely around the bore. The channel 61 is located just inboard of the head 52, or just below the flange 56, and when the gasket 51 is properly fit in the aperture 50, the channel 61 is located just inboard of the outer surface 44 of the strut 21.

Figure 3:
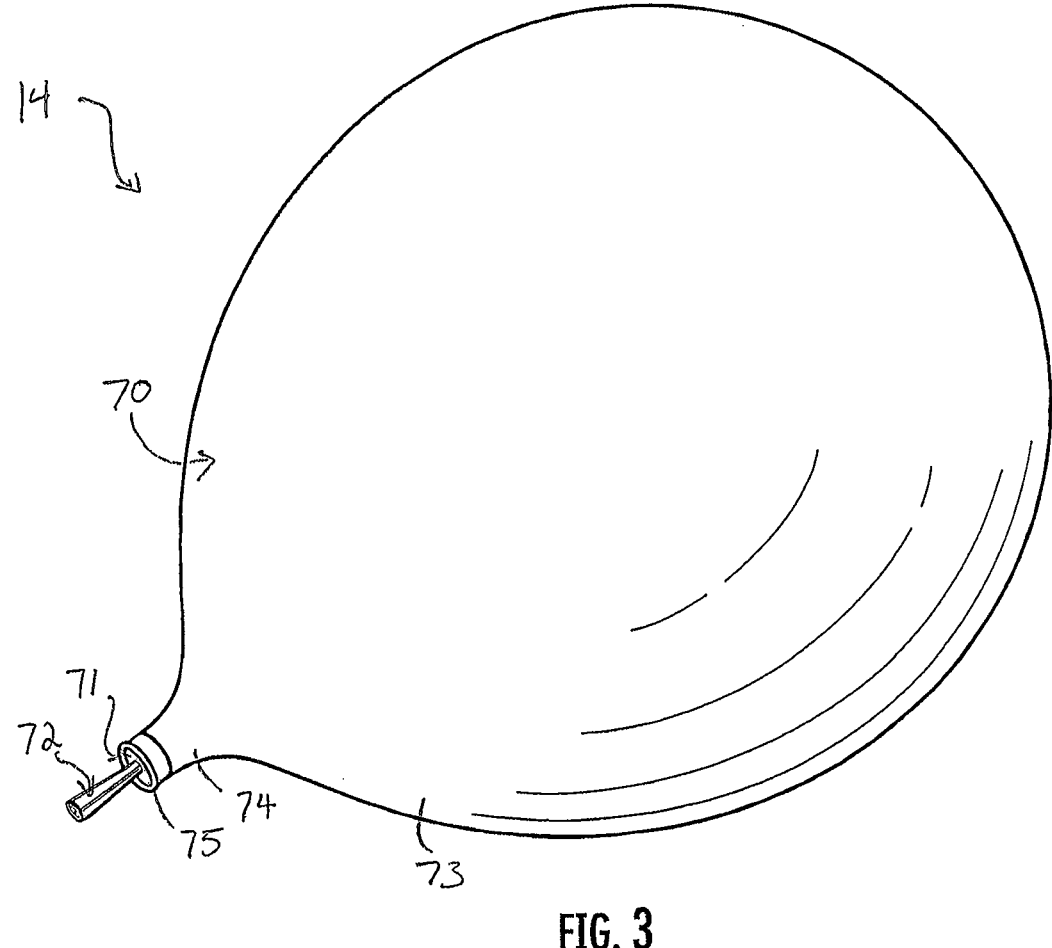
FIG. 3 is an isolated perspective view of a balloon of one of the balloon garland assemblies of FIG. 1A.

The bore 60 receives the balloon assembly 14 and couples it in gaseous communication with the interior 43 of the strut 21. FIG. 3 shows the balloon assembly 14. The balloon assembly 14 includes the balloon 70 itself, an expander 71 set inside the 70, and a stem 72 extending outward from the expander 71.

The balloon 70 has a balloon body 73 which can be inflated and expanded. The balloon body 73 is formed integrally to a neck 74, which largely resists expansion when the body 73 is expanded. The neck 74 terminates in a lip 75, which is a dense ring of material at the end of the balloon 70.

The expander 71 is shown more clearly in FIG. 5. The expander 71 has a disc-shaped rigid body 80 having an inner face 81, an outer face 82, an outer sidewall 83, and a bore 84 through the middle of the body 80. The inner and outer faces 81 and 82 are circular and coaxial and have a common outer diameter 85, which is the outer diameter of the expander 71. The sidewall 83 has a height 86 between the inner and outer faces 81 and 82 which is approximately one-third of the diameter 85 of those faces 81 and 82. The expander 71 is disposed within the neck 74 of the balloon 70, just inboard of the lip 75. The expander 71 urges the neck 74 radially outward in resilient engagement. This forms an air-impermeable seal between the expander 71 and an inner surface 76 of the balloon 70. In some embodiments, sonic welding, an adhesive, or some other means seals the expander 71 to the inner surface 76.

The bore 84 extends centrally through the expander 71, entirely between the inner and outer faces 81 and 82. The bore 84 is defined by an annular inner wall 87 of the expander 71. The stem 72 is fit into the bore 84, either by a press-fit engagement or some other fit that forms an air-impermeable fit between the stem 72 and the inner wall 87. The stem 72 extends outward from the expander 71 away from the balloon 70.

Still referring to FIG. 5, the stem 72 includes a base 90, an opposed nozzle 91, and a sidewall 92 extending from the base 90 to the nozzle 91. The sidewall 92 of the stem 72 is rigid, and so the entire stem 72 is rigid. The stem 72 further includes an internal valve 93 that controls the passage of gas within the stem 72.

The base 90 of the stem 72 is a slender cylinder. It terminates in a mouth 94 (at the top of the stem 72 as shown in the orientation of FIG. 5). The mouth 94 is circular and has an outer diameter corresponding in size and shape to the bore 84 of the expander 71. The entirety of the base 90 has this outer diameter and is t fit into the bore 84 to form an air-impermeable fit. Below the expander 71, the sidewall 92 of the stem 72 flares outward to the larger outer diameter of the nozzle 91.

The nozzle 91 is fit into the gasket 51. The nozzle 91 is a larger cylinder than the base 90. It terminates at a lip 95, which is annular flange projecting radially outward.

The lip 95 is received by and set into the channel 61 in the gasket 51. The outer diameter of the lip 95 is just slightly larger than the inner diameter of the channel 61, so that the lip 95 and channel 61 form a tight, air-impermeable seal. When so fit this way, the lip 95 of the stem 72 is inboard of the outer surface 44 of the strut 21 and compresses the material of the body 54 of the gasket 51 radially against the aperture 50. This increases the tightness of the fit between the stem 72, the gasket 51, and the strut 21.

In this embodiment, the nozzle 91 and the lip 95 have a cross-sectional shape which is circular. However, this is not limiting. In other embodiments, the nozzle 91 and the lip 95 have a cross-section which has the shape of a rectangle, square, oval, triangle, pentagon, hexagon, heptagon, nonagon, decagon, star, or other shape, regular, irregular, or otherwise.

The stem 72 further includes an internal bore 96 extending entirely from base 90 to the nozzle 91. The bore 96 allows gas to communicate entirely through the stem 72. The valve 93 is disposed within the bore 96. The valve 93 is a one-way valve and is a flap of material extending from one side of the bore 96 to an opposed side and is shaped to fit against the interior of the bore 96. The valve 93 flaps; it is moveable, and it moves to open and close the bore 96. When gas is transmitted from the interior 43 of the strut into the gasket 51 and into the stem 72, the gas pushes the valve 93 against the side of the bore 96 to open the bore 96, thereby allowing the gas to move into the balloon body 73 and thus inflate the balloon 70. When gas has stopped transmitting from the interior 43, the flap snaps back across the bore, sealing against the bore 96 to close the bore 96, thereby preventing the gas from moving out of the balloon body 73. In this way, the valve 93 selectively enables the admission of gas into the balloon body 73 through the stem 72 and disables the emission of gas from the balloon body 73 through the stem 72. The valve 93 has other forms in other embodiments. For example, the valve 93 may be a diaphragm or check valve capable of enabling admission of gas but disabling emission of it.

In operation, the assemblies 10 and 11 are useful for a decorator or party host to quickly build a decorative and festive display. In one manner of doing so, the host places one or two bases 20 on the ground or mounts them to a vertical surface. As already explained above, this disclosure contemplate the creation of all different types of shapes and configurations of the balloon garland assembly described herein. This section of the description refers to the construction of the assembly 10 because it is shown in the drawings, but the reader should understand, after reading the below, how to construct any other shape and configuration with the structural elements and features described above.

The host places two bases 20 on the ground, spaced apart. The hose then couples a strut 21 to each one, then a connector 22 to the upper ends 40 of those struts 21, then another two struts 21, then another connector 22, and so on. To build the assembly 10, the host uses obtuse connectors 22b. The host does this until the arch of the assembly 10 is formed.

The host then takes a large number of balloon assemblies 14 and plugs them into the sockets 23. The host does this by grasping the stem 72, registering the nozzle 91 with the bore 60 in the head 52 of the gasket 51, and then pushing the nozzle 91 into the bore 60. The host does this until hearing or feeling a small click or pop, indicating that the lip 95 of the stem 72 has snapped into the channel 61 in the body 54 of the gasket 51.

The host does this over and over for all the balloon assemblies 14 that the host wants to put on the garland assembly 10. The host may choose to fill every socket 23 or only some of the sockets 23.

The host then couples an air pump to the inlet 36 of the base 20. Generally, a single air pump attached to a single inlet 36 is sufficient to inflate all the balloon assemblies 14. However, in large assemblies 10, the host may wish to attach an air pump to the inlet 36 of both bases 20 and inflate from both sides of the assembly 10.

The host runs the air pump to transmit gas (here, preferably, air or helium) into the base 20, into the struts 21, and then into balloon assemblies 14. The valves 93 in the balloon assemblies 14 snap open to enable the admission of air into the balloon bodies 73. Typically, less than a minute is required to inflate all of the balloon assemblies 14. The host can easily construct and inflate the balloon garland assembly 10 in less than ten or twenty minutes. When the balloon assemblies 14 are inflated, the host turns the air pump off. The valves 93 in the balloon assemblies 14 snap closed and remain closed, keeping the balloon assemblies 14 inflated.

In another method of construction, the host picks up a single strut 21 and installs balloon assemblies 14 in that strut 21. Capping one end of the strut 21, the host can connect the other to a pump, and operate the pump to inflate the balloon assemblies 14 on that strut. When the host turns the pump off, the balloon assemblies 14 remain inflated. The host can put that strut 21 and pick up another one and inflate its balloon assemblies 14. The host can do this over and over until there are many struts 21 on which the balloon assemblies 14 are inflated. The host can then assemble the frame assembly 11 by connecting these struts 21 to each other.

Figure 6:
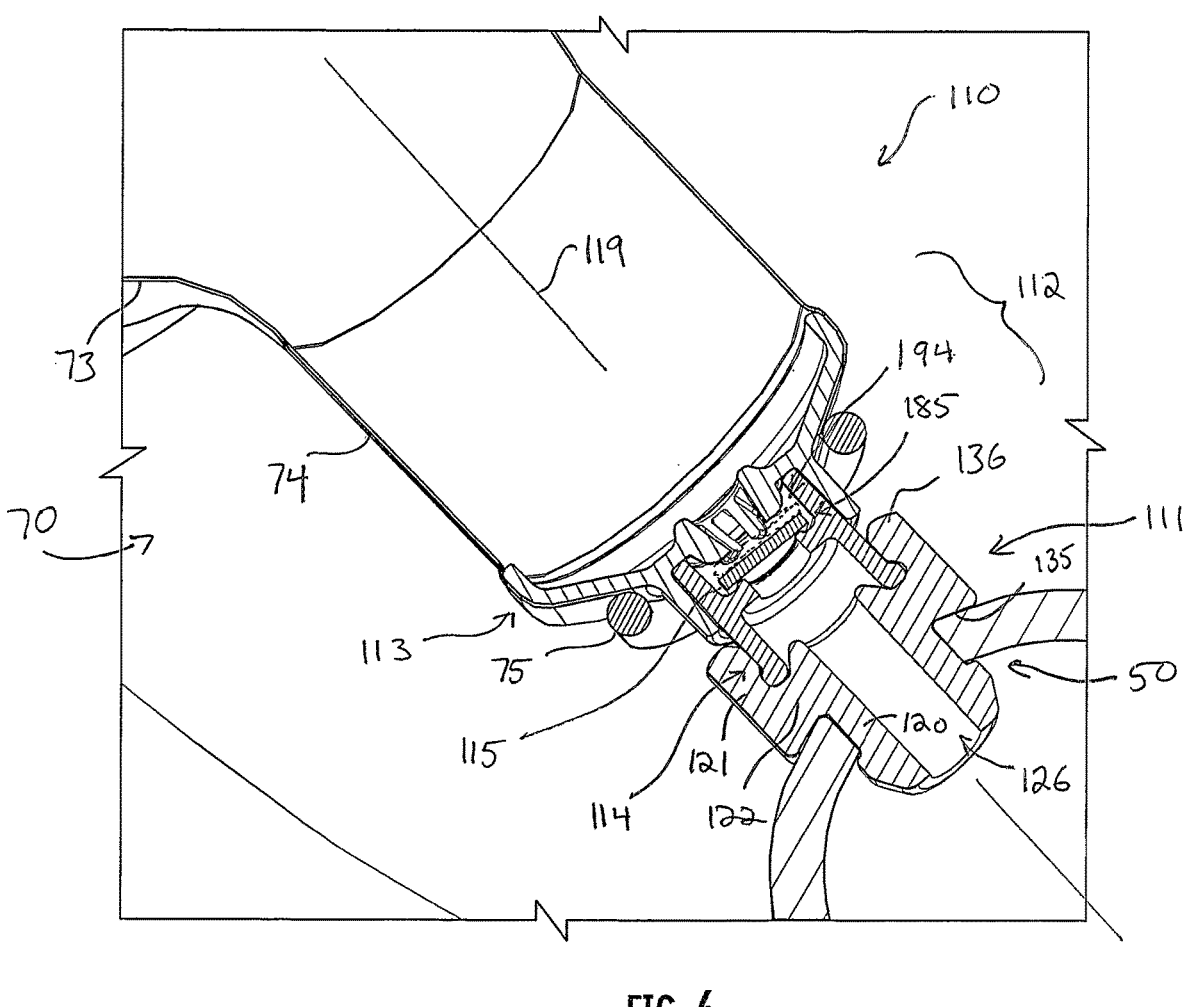
FIG. 6 is a section view of an alternate embodiment of a balloon assembly.
Figure 7A:
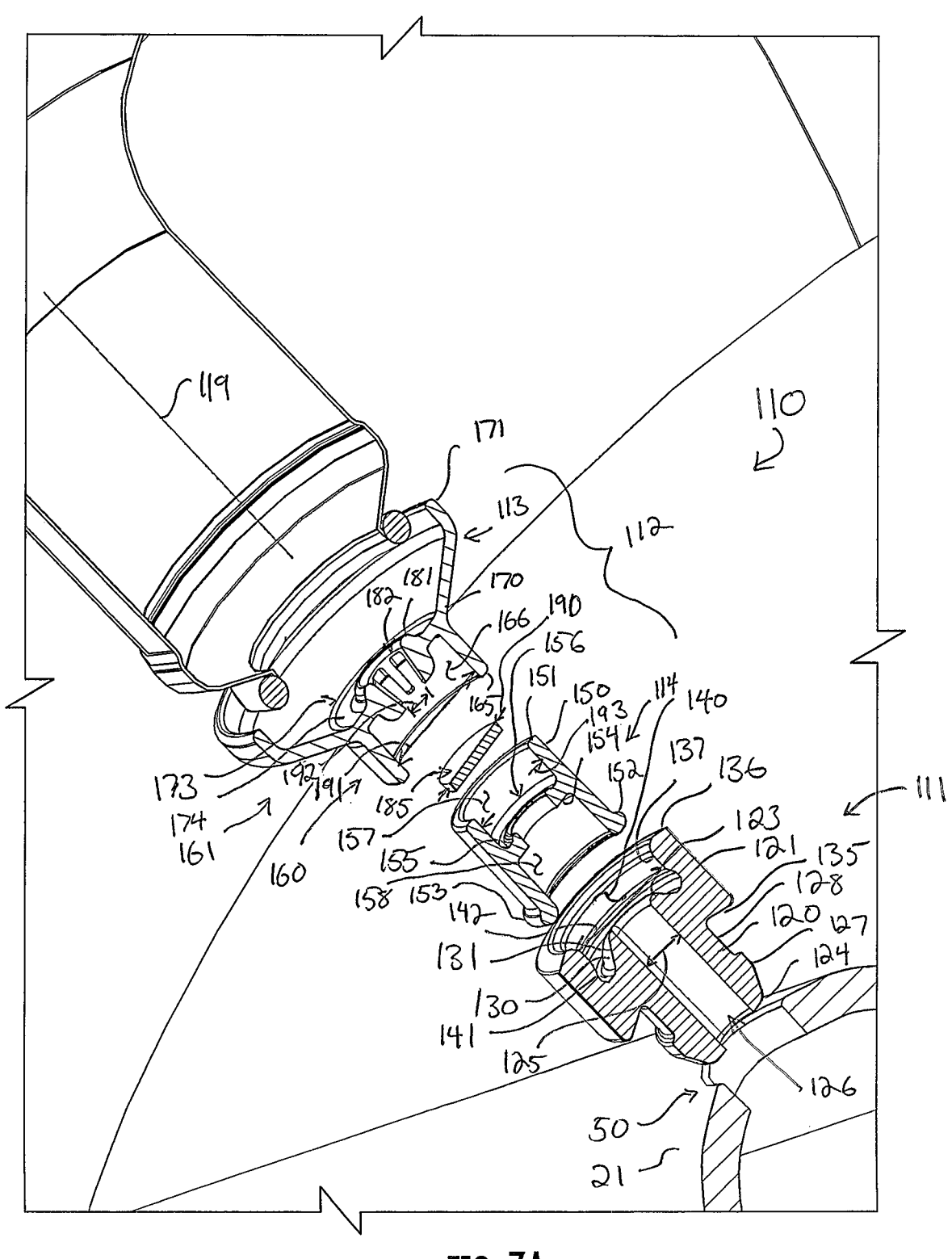
FIGS. 7A and 7B are upper and lower perspective section views of the balloon assembly of FIG. 6, respectively.
Figure 7B:
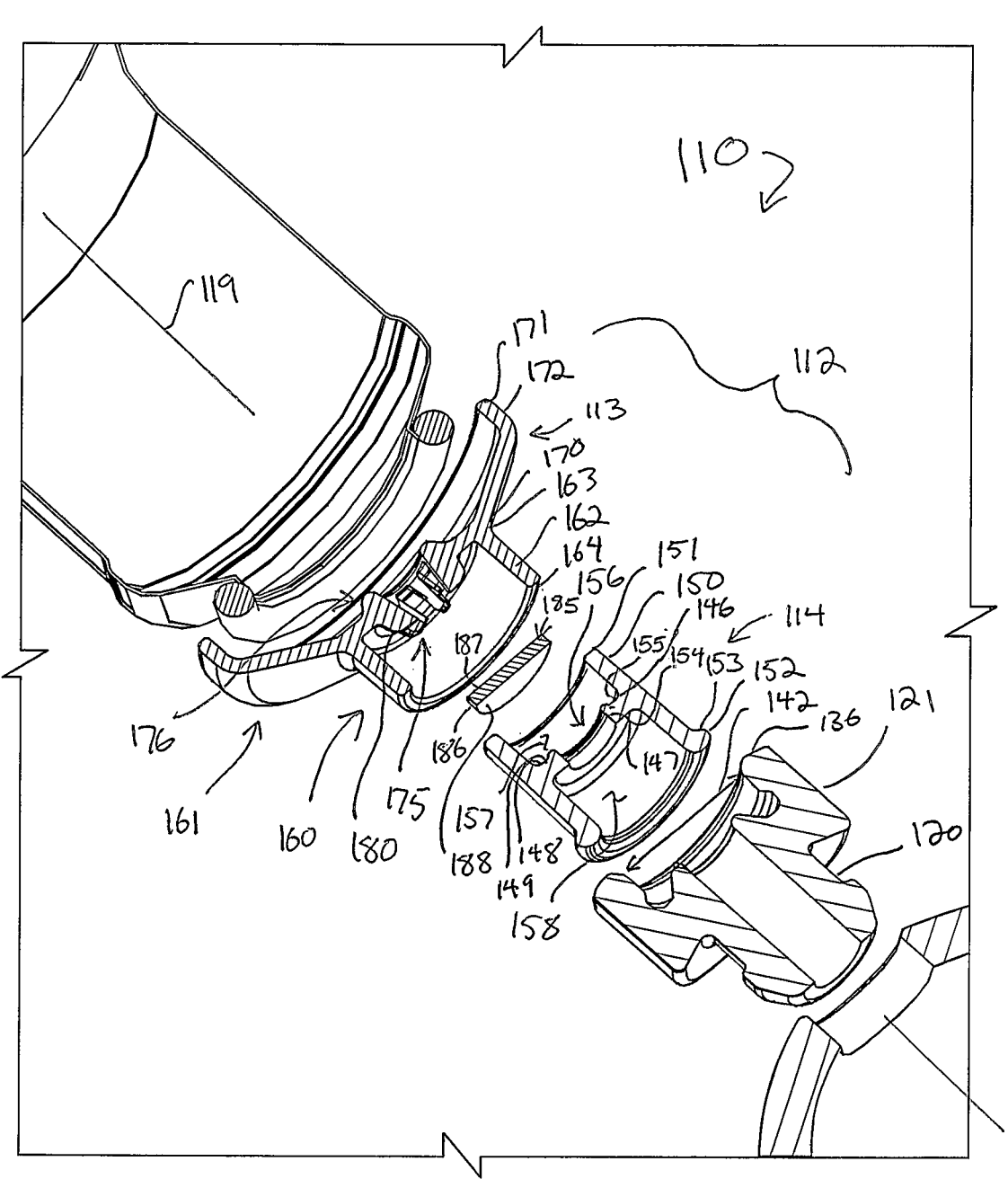

Turning now to FIGS. 6-10, the illustrations show two alternate embodiments of balloon assemblies. FIGS. 6-7B show section views of a balloon assembly 110. The description below refers to FIGS. 6-7B generally without distinction unless so specified, and the reader will understand that some reference characters identified below appear in only one or two of FIGS. 6-7B, while others appear in all of them, and the description may not specifically point out in which of FIGS. 6-7B any particular reference character appears. Both of the balloon assemblies 110 and 210 have rotational symmetry, and so FIGS. 6-10 are section views; the user will understand the outer structural elements and features of the balloon assemblies 110 and 210 from these views.

Like the balloon assembly 14, the balloon assembly 110 includes the balloon 70. The balloon 70 is identical to the balloon 70 described above with respect to the balloon assembly 14; it has a balloon body 73, a neck 74, and a lip 75. The balloon assembly 110, however, is different from the balloon assembly 14; the balloon assembly 110 includes a port 111 and a valve assembly 112 including an upper valve body 113, a lower valve body 114, and a disc 115 disposed between the upper and lower valve bodies 113 and 114 for movement therebetween to enable and disable the passage of air or other gas through the valve assembly 112.

The port 111 of the balloon assembly 110 has an inner sidewall 120 and an outer sidewall 121 disposed just slightly outboard of the inner sidewall 120. The inner and outer sidewalls 120 and 121 are connected to each other as a single, integral, monolithic structure, but are spaced apart from each other by a lateral flange 122. The flange 122 extends radially outward from the inner sidewall 120 to the outer sidewall 121. The flange 122 is also part of the single, integral, monolithic structure of the inner and outer sidewalls 120 and 121.

The inner sidewall 120 has an upper end 123, an opposed lower end 124, and a constant inner diameter 125 spanning an open central channel 126 which extends axially and entirely from the upper end 123 to the lower end 124.

The central channel 126 is a single inlet for the passage of air or other gas into the body 73 of the balloon 70. In other words, in preferred embodiments, the central channel 126 is preferably the only inlet into the port 111 or the balloon assembly 110 through which gas can be admitted and passed to the balloon 70.

The lower end 124 of the inner sidewall 120 is formed with a barb 127, which is an annular enlargement of the outer diameter of the inner sidewall 120. Above the barb 127, the inner sidewall 120 has a neck 128 with a smaller thickness, and so a smaller outer diameter, than at the barb 127. This neck 128 fits snugly into the aperture 50 in the strut 21, so that gas applied to the strut 21 passes through the central channel 126 of the port 111 stuck in the aperture 50, then through the valve assembly 112, and then into the balloon 70. When the port 111 is properly seated in the aperture 50, the barb 127 is on the inside of the strut 21.

The upper end 123 of the inner sidewall 120 rises to an open frustum 130. A frustum is a portion of a cone which is truncated at its top or narrow end. The open frustum 130 of the inner sidewall 120 rises to an annular rim bounding a mouth instead of rising to a pointed tip. The frustum 130 is open because the central channel 126 passes axially through the port 111, and thus opens the frustum 130 at what would otherwise be a conical tip. The frustum 130 has an outer sloping face 131 which defines the conical shape of the frustum 130.

The outer sidewall 121 has an upper end 133 and an opposed lower end 134. The flange 122 connecting the inner and outer sidewalls 120 and 121 extends from the upper end 123 of the inner sidewall 120 to the lower end 134 of the outer sidewall 121. It is a thick, short extension between the two sidewalls 120 and 121. The underside of the flange 122 transitions to the lower end 134 of the outer sidewall 121, which has a sloped lower surface 135 that projects downward and outward. When the port 111 is properly fit into the aperture 50, the sloped lower surface 135 sits in flush contact along the convex outer surface of the strut 21.

Opposite the lower end 134, the outer sidewall 121 terminates at the upper end 133 which defines a rim 136. The rim 136 includes a wide lip 137 which is pointed or directed radially inward. The outer sidewall 121 bounds and defines a socket 140 between the upper end 123 of the inner sidewall 120 and the rim 136 at the upper end 133 of the outer sidewall 121. At the rim 136, the outer sidewall 121 has an inner diameter 142. The inner diameter 142 of the outer sidewall 121 is larger than the inner diameter 125 of the open central channel 126.

The socket 140 is open at its top and bottom ends and is joined in fluid communication with the central channel 126 extending within the inner sidewall 120. The socket 140 is generally cylindrical, and the frustum 130 extends slightly into the socket 140 from its bottom end.

The frustum 130 of the inner sidewall 120 cooperates with the wide rim 136 to define an annular receiving space 141 at the bottom of the socket 140. The annular receiving space 141 extends continuously around the bottom end of the socket 140, downward into the flange 122 and radially into the outer sidewall 121 as a recess therein.

With reference still to FIGS. 6-7B, the valve assembly 112 includes the upper and lower valve bodies 113 and 114. The upper and lower valve bodies 113 and 114 are separate and discrete from each other, and from the port 111. In other words, they do not form a single, integral, monolithic piece but rather can be separated from each other and applied to each other.

The lower valve body 114 has a generally cylindrical body defined by a sidewall 150 extending between opposed upper and lower ends 151 and 152. The sidewall 150 has a constant outer diameter along its height between the upper and lower ends 151 and 152 except at the lower end 152 where a lip 153 is directed radially outward and acts to increase the outer diameter at that location. When the valve assembly 112 is received in the socket 140 of the port 111, that lip 153 snugly fits into the annular receiving space 141 in the port 111 defined between the lip 137 and the sloping face 131 of the frustum 130. The sidewall 150 of the lower valve body 114 is received in the socket 140 of the port 111 against an inner surface of the outer sidewall 121 of the port 111.

Between the upper and lower ends 151 and 152, an inner flange 154 projects radially inward from the sidewall 150. The flange 154 is formed integrally and monolithically to the sidewall 150 and is oriented generally normal thereto. The inner flange 154 has an upper face 148 and a lower face, each extending between a perimeter edge 146 proximate the sidewall 150 and a mouth 147 opposite the sidewall 150. While the lower face is substantially flat, the upper face 148 is concave, forming a recessed channel 149 that defines an annular seat 155. That annular seat 155 bounds a valve aperture 1556 within the lower valve body 114. The flange 154 bifurcates the interior of the lower valve body into an upper chamber 157 and a lower chamber 158. The upper and lower chambers 157 and 158 are joined in fluid communication by the valve aperture 156 between them.

The upper valve body 113 has a lower collar 160 and an upper cone 161 formed integrally and monolithically to each other at a juncture. The lower collar 160 has a generally cylindrical sidewall 162 extending between an upper end 163 and a lower end 164. The sidewall 162 has constant inner and outer diameters along its height between the upper and lower ends 163 and 164. The lower end 164 defines an open mouth 165 leading into an interior 166 within the upper valve body 113.

That interior 166 extends from within the lower collar 160 to the upper cone 161. The upper cone 161 projects radially outward, away from the lower collar 160. The upper cone 161 is a frustum, or an inverted frustum, with a narrow base at a lower end 170 and a wide opening at an upper end 171. The lower end 170 of the upper cone 161 is contiguous to the upper end 163 of the lower collar 160. The upper cone 161 projects radially outward to the upper end 171, which then turns axially to define an upstanding lip 172. The upstanding lip 172 is parallel to an axis 119 extending centrally through the balloon assembly 110.

The interior 166 of the upper cone 161 is partially separated by a slotted cup 173. The slotted cup 173 is supported within the interior 166 by an endwall 174 that projects inward from the sidewall of the upper valve body 113. That endwall is a continuous annulus, extending radially inward from the upper end 163 of the lower collar 160 and the lower end 170 of the upper cone 161 to the slotted cup 173.

The slotted cup 173 is slightly tapered, from a narrower inlet 175, disposed in the portion of the interior 166 encircled by the lower collar 160, to a wider outlet 176, disposed in the portion of the interior 166 encircled by the upper cone 161. The slotted cup 173 has a sidewall 180 which tapers from the outlet 176 to the inlet 175. The sidewall 180 is also slotted, formed from several fingers 181—six fingers 181 are preferable but not critical—which are spaced apart by slots 182. Both the fingers 181 and the slots 182 are oriented axially or are parallel to the axis 119 extending centrally through the balloon assembly 110. The fingers 181 have bases which are formed integrally and monolithically to the outlet 176, which defines a raised or projecting ring with respect to the endwall 174. Opposite the bases, the fingers 181 have free ends which project into the interior 166 encircled by the lower collar 160. Thus, the open bottom inlet 175 projects below the endwall 174 and the open top outlet 176 projects above the endwall 174.

Although the interior 166 is partially separated by the endwall 174, the slots 182 join the two portions of the interior 166 encircled by the lower collar 160 and encircled by the upper cone 161. Air or another gas can move through the slots 182 of the slotted cup 173 freely without restriction.

In operation, the neck 74 of the balloon 70 is stretched over the upper valve body 113. The neck 74 is elastically deformed to stretch over the upstanding lip 172 of the upper cone 161. The neck 74 is further stretched over the upper cone 161 such that the lip 75 of the balloon 70 rests at the concave juncture between the upper cone 161 and the lower collar 160. The lip 75 constricts in this location, holding the balloon 70 securely on the upper valve body 83.

A disc 185 is disposed between the upper and lower valve bodies for movement therein and therebetween. In operation, when the balloon assembly 110 is assembled, the balloon 70 is fit over the upper valve body 113, the upper valve body 113 is fit over the lower valve body 114, and the lower valve body 114 is fit within the port 111. More specifically, the sidewall 162 of the upper valve body 113, along the lower collar 160, is received over and snug fit around an outer surface of the sidewall 150 of the lower valve body 114, extending down the sidewall to just approximately the axial location of the inner flange 154. When so assembled, the sidewall 150 of the lower valve body 114, the annular seat 155, the endwall 174 of the upper valve body 113, and the slotted cup 173 cooperate to define an interior 194 (see FIG. 6) bound between the upper and lower valve bodies 113 and 114. The interior 194 is a small space, but the disc 185 is disposed in this interior 194.

The disc 185 has a thin, circular body with a perimeter edge 186 defining an outer diameter 190 and opposed upper and lower faces 187 and 188. That outer diameter 190 is smaller than an inner diameter 191 of the lower collar of the upper valve body 113, is larger than an inner diameter 192 of the slotted cup 173, and is smaller than an inner diameter 193 of the sidewall 150 of the lower valve body 114. The inner diameter 191 of the lower collar 160 of the upper valve body 113 extends within the sidewall 162 of the lower collar 160. The inner diameter 192 of the slotted cup 173 is the outer diameter of the central channel through the slotted cup 173 at the bottom inlet 175, defined between opposed fingers 181. The inner diameter 193 of the sidewall 150 of the lower valve body 114 is larger than the inner diameter 125 of the inner sidewall 120 of the port 111, but is smaller than the inner diameter 142 of the outer sidewall 121 of the port 111.

The disc 185 is a valve member for alternately opening and occluding the valve assembly 112. It moves between two positions.

In a first position, shown in FIG. 6, the disc 185 is against the lower valve body 114, disabling the passage of air or other gas through the valve assembly 112 from the balloon 70 to the port 111. In this first position, the lower face 188 of the disc 185 contacts and lies against the annular seat 155 of the lower valve body 114, sealing there and closing the valve aperture 156. The disc 185 is biased into the first position when the gas pressure against the upper face 187 exceeds the gas pressure against the lower face 188. In other words, the disc 185 moves into the first position when the pressure in the balloon 70 is greater than in the port 111.

In the second position, shown in FIG. 6 in broken line, the disc 185 is away from the lower valve body 114, enabling the passage of air or other gas through the valve assembly 112 from the port 111 to the balloon 70. In this second position, the lower face 188 of the disc 185 moves out of contact from the annular seat 155 of the lower valve body 114, opening the valve aperture 156. The upper face 187 of the disc 185 moves against the free ends of the fingers 181 of the slotted cup 173. The disc 185 is biased into the second position when the gas pressure against the lower face 188 exceeds the gas pressure against the upper face 187. In other words, the disc 185 moves into the second position when the pressure in the port 111 is greater than in the balloon 70. In the second position, gas is enabled to flow from the port, through the lower valve body 114, around the disc 185, through the slots 182 of the slotted cup 173, into the upper cone 161 of the upper valve body 113, and into the body 73 of the balloon 70, thereby inflating the balloon 70.

The disc 185 moves from the first position to the second position in response to the passage of air or other gas through the valve assembly 112 from the single inlet of the port 111, defined by the central channel 126, to the balloon 70.

Figure 8:
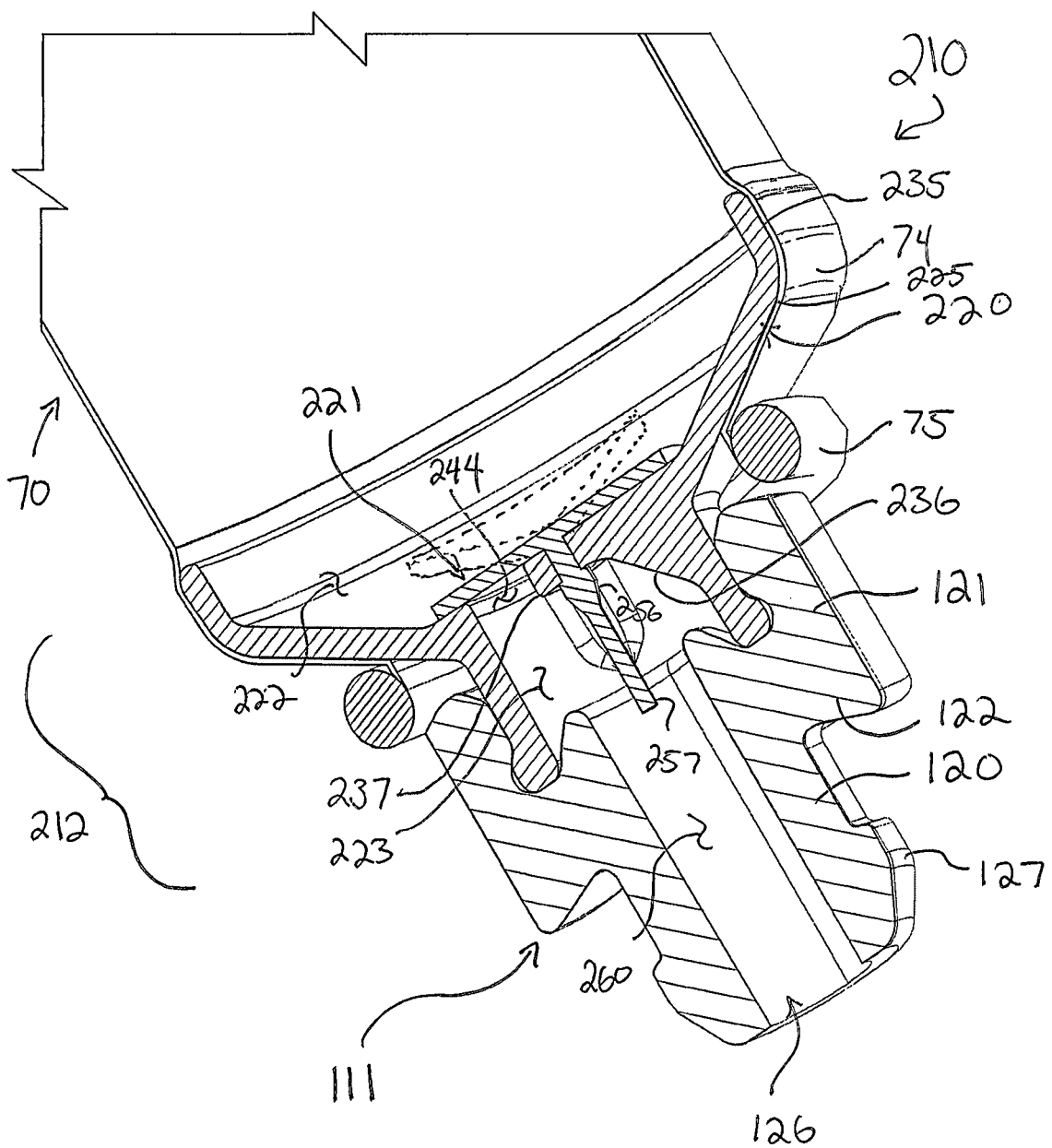
FIG. 8 is a section view of an alternate embodiment of a balloon assembly.
Figure 9A:
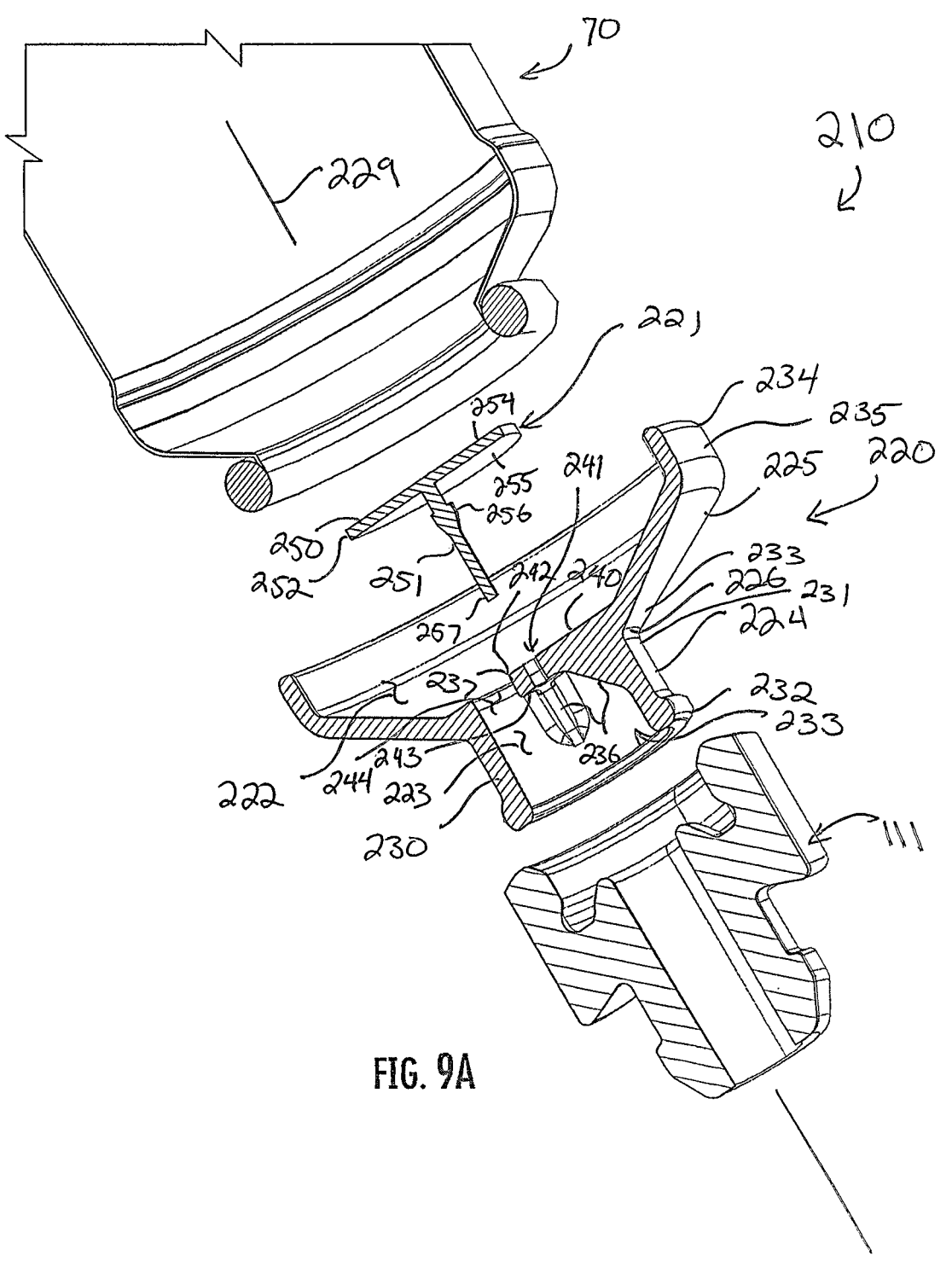
FIGS. 9A, 9B, and 10 are upper, lower, and upper perspective section views of the balloon assembly of FIG. 8, respectively.
Figure 9B:
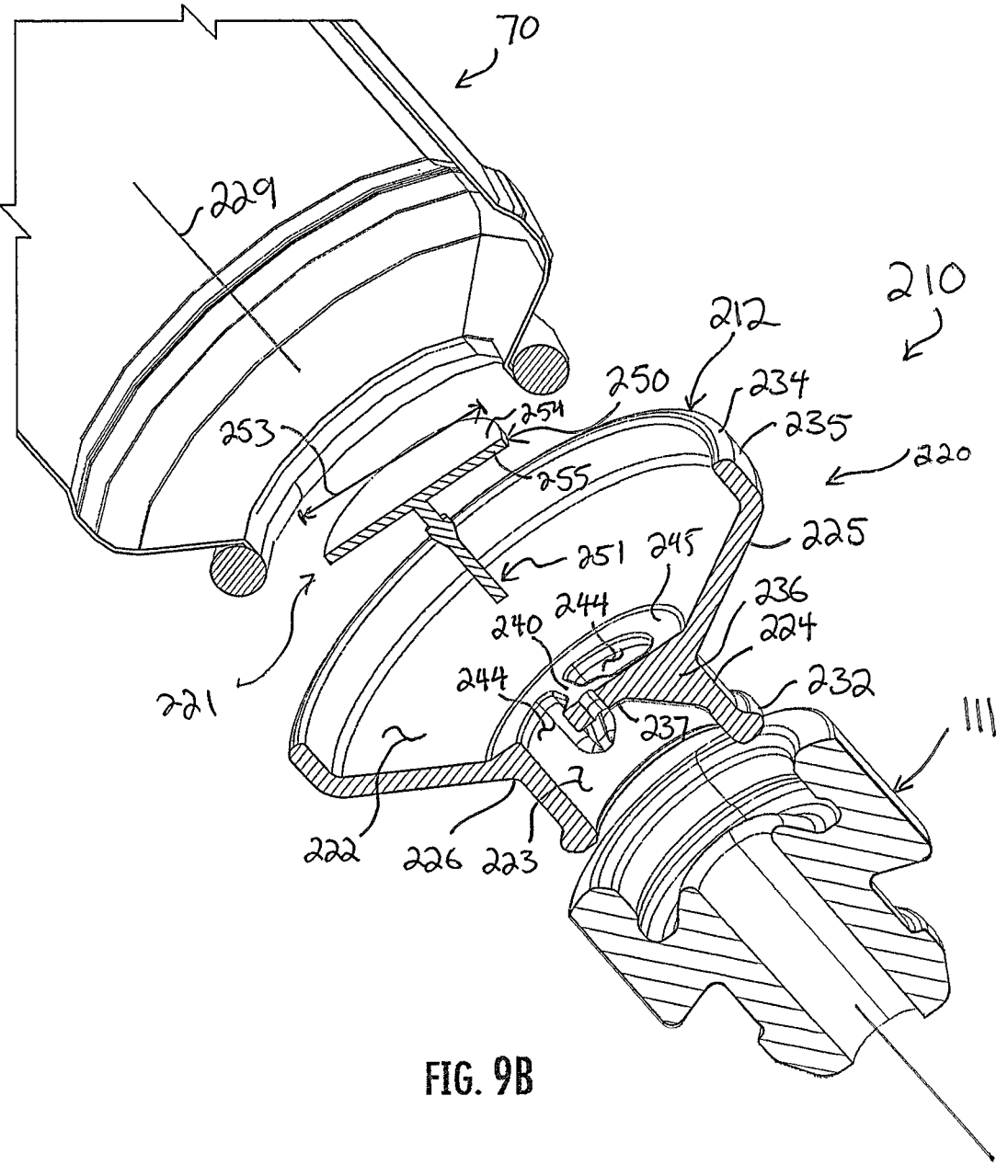
Figure 10:
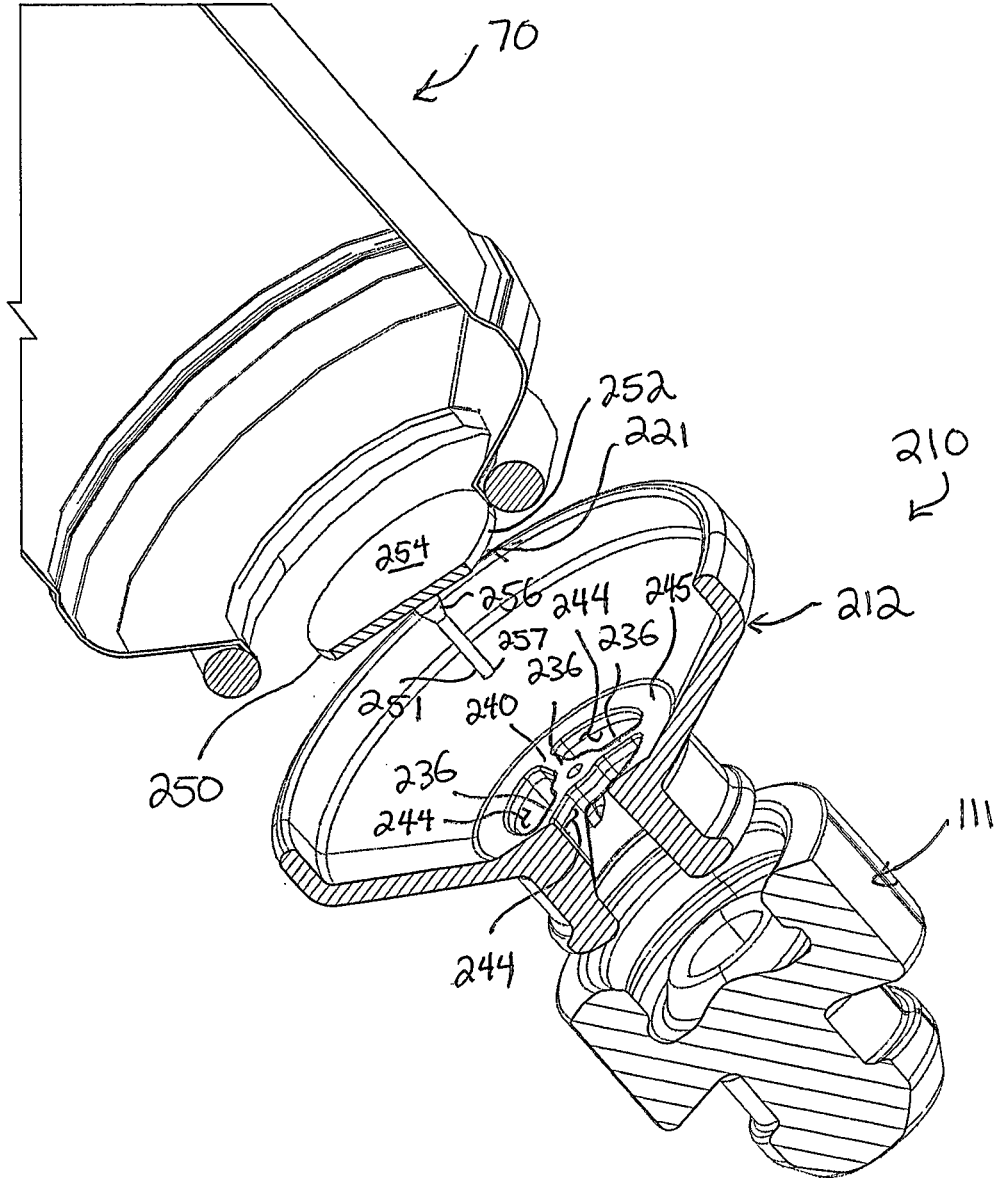

FIGS. 8-10 show section views of a balloon assembly 210. The description below refers to FIGS. 8-10 generally without distinction unless so specified, and the reader will understand that some reference characters identified below appear in only one or two of FIGS. 8-10, while others appear in all of them, and the description may not specifically point out in which of FIGS. 8-10 any particular reference character appears.

Like the balloon assemblies 14 and 110, the balloon assembly 210 includes the balloon 70. Moreover, like the balloon assembly 110, the balloon assembly 210 includes a port 111 and a valve assembly 212. However, while the port 111 of the balloon assembly 210 is identical to the port 111 of the balloon assembly 110, the valve assembly 212 is different from that described with respect to the balloon assembly 110.

The port 111 shown with respect to the balloon assembly 210 is identical to the port 111 in the balloon assembly 110. It includes identical structural elements and features. As such, the specification here does not describe the port 111 again. The port 111 in the FIGS. 8-10 uses the same reference characters as used to identify the structural elements and features of the port 111. Some reference characters are not shown in order to preserve the clarity of the drawings; the reader will understand their corresponding structures from the previous description with respect to the balloon assembly 110, however.

With reference still to FIGS. 8-10, the valve assembly 212 includes a valve body 220 and a diaphragm 221. The diaphragm 221 bifurcates an interior of the valve body 220 into an upper chamber 222 and a lower chamber 223. The lower chamber 223 is joined in fluid communication with the central channel 126, and is joined in fluid communication with the upper chamber 222 when the diaphragm 221 is specifically arranged. The diaphragm 221 is placed in a first or neutral arrangement when the pressure inside the balloon 70 is higher than the pressure in the central channel 126 and is placed into a second or biased arrangement when the pressure inside the balloon 70 is lower than the pressure in the central channel 126, such as when gas is being admitted into the balloon 70 from the central channel 126.

The valve body 220 has a lower collar 224 and an upper cone 225 formed integrally and monolithically to each other at a juncture 226. The lower collar 224 has a generally cylindrical sidewall 230 extending between an upper end 231 and a lower end 232. The sidewall 230 has constant inner and outer diameters along its height between the upper and lower ends 231 and 232. The lower end 232 defines an open mouth leading into the lower chamber 223 of the interior within the valve body 220.

That lower chamber 223 extends from within the lower collar 224 to the upper cone 225, where it becomes the upper chamber 222. The upper cone 225 projects radially outward, away from the lower collar 224. The upper cone 225 is a frustum, or an inverted frustum, with a narrow base at a lower end 233 and a wide opening at an upper end 234. The lower end 233 of the upper cone 225 is contiguous to the upper end 231 of the lower collar 224. The upper cone 225 projects radially outward to the upper end 234, which then turns axially to define an upstanding lip 235. The upstanding lip 235 is parallel to an axis 229 extending centrally through the balloon assembly 210.

The upper and lower chambers 222 and 223 are partially separated by ribs 236. In the embodiment shown in these drawings, there are three ribs 236 (only two are visible in the section views of FIGS. 8, 9A, and 9B, while three are visible in the section view of FIG. 10). The ribs 236 are circumferentially spaced apart at one hundred twenty degrees. The ribs 236 extend inward from the sidewall of the valve body 220 to a central ring 237. Each rib 236 has a wide outer end formed integrally and monolithically to the sidewall of the valve body 220 and tapering like in triangular fashion toward the ring 237. Each of the ribs 236 has a flat top 240, and the three flat tops 240 are flush and level with each other, just above the juncture 226 between the lower collar 224 and the upper cone 225.

The ring 237 has a top 242 and an opposed bottom 243. The top 242 of the ring 237 is level with and contiguous to the flat tops 240 of the ribs 236. The ring 237 has a bore 241 located centrally therein, along the axis 229, and extending entirely through the ring 237 from the top 242 to the bottom 243.

Although the upper and lower chambers 222 and 223 166 are partially separated by the ribs 236, the ribs 236 are spaced apart by wedge-shaped slots 244 therebetween. The slots 244 join the upper and lower chambers 222 and 223 of the interior of the valve body 220. The slots 244 are set in slightly by an annular rim defined by and between the wide ends of the ribs 236. This annular is an annular seat 245 best shown in FIG. 9B. Air or another gas can move through the slots 244 when the diaphragm is properly arranged.

The diaphragm 221 includes a single-piece, integral, monolithic disc 250 and stem 251. The disc 250 has a thin, circular body with a perimeter edge 252 defining an outer diameter 253 and opposed upper and lower faces 254 and 255. The stem 251 extends out from the lower face 255 and includes a barb 256 between the disc 250 and a free end 257 of the stem 251. The disc 250 is a valve member for alternately opening and occluding the valve assembly 212. It moves between two positions or arrangements.

In a first arrangement, shown in solid line in FIG. 8, the disc 250 is against the flat tops 240 of the ribs 236, extending entirely over and occluding the slots 244, disabling the passage of air or other gas through the valve assembly 212 from the balloon 70 to the port 111. In this first arrangement, the lower face 255 of the disc 250 contacts and lies against the flat tops 240 and annular seat 245, sealing there and closing the slots 244. The disc 250 is biased into the first arrangement when the gas pressure against the upper face 254 exceeds the gas pressure against the lower face 255. In other words, the diaphragm 221 moves into the first arrangement when the pressure in the balloon 70 is greater than in the port 111.

In the second arrangement, shown in broken line in FIG. 8 in broken line, the disc 250 is away from the annular seat 245, enabling the passage of air or other gas through the valve assembly 212 from the port 111 to the balloon 70. In this second arrangement, the lower face 255 of the disc 250 moves out of contact from the annular seat 245, opening the slots 244. The stem 251 continues to hold the center of the disc 250 in place, but the perimeter edge 252 of the disc 250 moves out of contact with the annular seat 245. The disc 250 is biased into the second arrangement when the gas pressure against the lower face 255 exceeds the gas pressure against the upper face 254. In other words, the disc 250 moves into the second arrangement when the pressure in the port 111 is greater than in the balloon 70. In the second arrangement, gas is enabled to flow from the port 111, through the valve body 220, into the lower chamber 223, through the slots 244, around the disc 250, into the upper chamber 222, and into the body 73 of the balloon 70, thereby inflating the balloon 70.

The disc 250 moves from the first arrangement to the second arrangement in response to the passage of air or other gas through the valve assembly 212 from the single inlet of the port 111, defined by the central channel 126, to the balloon 70.

In operation, the neck 74 of the balloon 70 is stretched over the valve body 220. The neck 74 is elastically deformed to stretch over the upstanding lip 235 of the upper cone 225. The neck 74 is further stretched over the upper cone 225 such that the lip 75 of the balloon 70 rests at the concave juncture 226 between the upper cone 225 and the lower collar 224. The lip 75 constricts in this location, holding the balloon 70 securely on the upper valve body 220.

In operation, when the balloon assembly 210 is assembled, the balloon 70 is fit over the valve body 220, and the valve body 220 is fit within the port 111.

More specifically, the sidewall 230 of the valve body 220, along the lower collar 224, is received in a snug-fit arrangement within an inner surface of the outer sidewall 121 of the port 111, and the lower end 232 is disposed within the annular receiving space 141 of the port 111.

When so assembled, the valve body 220 and the port 111 cooperate to define a common interior 260 through which gas passes into the balloon 70. The diaphragm 221 is disposed in this interior 260 to move between the first and second arrangements in response to the application or passage of gas through the port 111 to the balloon 70.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

The invention claimed is:

1. A balloon assembly comprising:
   a balloon having a body and a neck terminating in a lip;
   a port, the port comprising:
      an inner sidewall and an outer sidewall spaced apart by a flange extending radially outward from the inner sidewall to the outer sidewall proximate a lower end of the outer sidewall;
      the inner sidewall has a lower end with a barb, an opposed upper end with a frustum, and an open central channel extending entirely through the inner sidewall from the lower end to the upper end; and
      the outer sidewall has the lower end with a sloped lower surface, an opposed upper end defining an upper rim of the port wherein the upper rim has a lip directed radially inward, and a socket in communication with the central channel; and
   a valve assembly received in the socket of the port, the valve assembly comprising:
      a lower valve body comprising a sidewall extending between upper and lower ends and having a lip directed radially outward at the lower end and an inner flange directed radially inward between the upper and lower ends, the inner flange defining an annular seat bounding a valve aperture within the lower valve body;
      an upper valve body comprising a lower collar, an upper cone projecting radially outward away from the lower collar, and a slotted cup, wherein the slotted cup is defined by a tapered sidewall comprising a plurality of fingers spaced apart by slots, an open bottom inlet, and an open top outlet, and the slotted cup is disposed within an interior of the upper valve body by an endwall extending radially inward from the collar to the slotted cup; and
      a disc disposed between the upper and lower valve bodies for movement therebetween.

2. The balloon assembly of claim 1, wherein:
   the port, the lower valve body, and the upper valve body are separate and discrete from each other;
   the sidewall of the lower valve body is received in the socket of the port against an inner surface of the outer sidewall of the port;
   the collar of the upper valve body is received over the lower valve body against an outer surface of the sidewall of the lower valve body; and
   the neck of the balloon extends over the cone and the lip is received against an outer sidewall of the upper valve body between the cone and the collar.

3. The balloon assembly of claim 1, wherein:
   the disc has an outer diameter;

the lower collar of the upper valve body has an inner diameter which is larger than the outer diameter of the disc;

the sidewall of the lower valve body has an inner diameter which is larger than the outer diameter of the disc; and the slotted cup has an inner diameter which is smaller than the outer diameter of the disc.

4. The balloon assembly of claim 1, wherein:

the open top outlet of the slotted cup projects above the endwall; and the open bottom inlet of the slotted cup projects below the endwall.

5. The balloon assembly of claim 1, wherein the inner flange of the lower valve body has a perimeter edge, an opposed mouth at the valve aperture, and an upper face extending between the perimeter edge and the mouth, wherein the upper face is formed with a recessed channel such that the upper face is concave.

6. The balloon assembly of claim 1, wherein:

the inner sidewall of the port has a first inner diameter and defines the channel as a single inlet for passage of gas into the body of the balloon;

the outer sidewall of the port has a second inner diameter larger than the first inner diameter; and the sidewall of the lower valve body has an inner diameter which is larger than the first inner diameter and smaller than the second inner diameter.

7. The balloon assembly of claim 1, wherein:

the frustum of the inner sidewall and the upper rim on the outer sidewall cooperate to define an annular receiving space which is radially recessed into the outer sidewall; and the lip of the lower valve body is snugly received in sealing contact in the annular receiving space of the port.

8. A balloon assembly comprising:

a balloon having a body and a neck terminating in a lip;

a port having only a single inlet for passage of gas into the body of the balloon;

a valve assembly comprising an upper valve body and a separate lower valve body cooperating to define an interior bound between the upper and lower valve bodies;

a valve member disposed in the interior which moves from a first position to a second position in response to the passage of air through the valve assembly from the single inlet of the port to the balloon;

in the first position, the valve member is against the lower valve body, disabling the passage of air through the valve assembly from the balloon to the port; and in the second position, the valve member is away from the lower valve body, enabling the passage of air through the valve assembly from the single inlet to the balloon;

wherein the port comprises:

an inner sidewall and an outer sidewall spaced apart by a flange extending radially outward from the inner sidewall to the outer sidewall proximate a lower end of the outer sidewall;

the inner sidewall has a lower end with a barb, an opposed upper end with a frustum, and an open central channel extending entirely through the inner sidewall from the lower to the upper end; and the outer sidewall has a lower end with a sloped lower surface, an opposed upper end defining an upper rim of the port, wherein the upper rim has a lip directed radially inward, and a socket in communication with the central channel.

9. The balloon assembly of claim 8, wherein:

the balloon is fit over the upper valve body;

the upper valve body is fit over the lower valve body; and the lower valve body is fit within the port.

10. The balloon assembly of claim 8, wherein:

the lower valve body includes an annular seat bounding a valve aperture within the lower valve body;

the upper valve body includes a slotted cup; and in the first position of the valve member, the valve member is received against the annular seat, and in the second position of the valve member, the valve member is received against the slotted cup.

11. The balloon assembly of claim 10, wherein:

the annular seat is formed by an inner flange directed radially inward between upper and lower ends of the lower valve body; and the slotted cup is defined by a tapered sidewall comprising a plurality of fingers spaced apart by slots, an open bottom inlet, and an open top outlet.

12. The balloon assembly of claim 8, wherein:

the lower valve body comprises a sidewall extending from upper and lower ends, and having a lip directed radially outward at the lower end and an inner flange directed radially inward between the upper and lower ends, the inner flange defining an annular seat bounding a valve aperture within the lower valve body; and the upper valve body comprises a lower collar, an upper cone projecting radially outward away from the lower collar, and a slotted cup, wherein the slotted cup is defined by a tapered sidewall comprising a plurality of fingers spaced apart by slots, an open bottom inlet, and an open top outlet, and the slotted cup is disposed within an interior of the upper valve body by an endwall extending radially inward from the collar to the slotted cup.

13. A balloon assembly comprising:

a balloon having a body and a neck terminating in a lip;

a port, the port comprising:

an inner sidewall and an outer sidewall spaced apart by a flange extending radially outward from the inner sidewall to the outer sidewall;

the inner sidewall has a lower end, an opposed upper end with a frustum, and an open central channel extending entirely through the inner sidewall from the lower to the upper end; and the outer sidewall has a lower end, an opposed upper end defining an upper rim of the port, and a socket in communication with the central channel; and a valve assembly received in the socket of the port, the valve assembly comprising:

a lower valve body comprising a sidewall extending from upper and lower ends, and having an inner flange defining an annular seat bounding a valve aperture within the lower valve body;

an upper valve body comprising a lower collar, an upper cone projecting radially outward away from the lower collar, and a slotted cup therebetween; and a disc disposed between the upper and lower valve bodies for movement from a first position to a second position in response to passage of air through the valve assembly from the port to the balloon.

14. The balloon assembly of claim 13, wherein:

in the first position, the disc is against the lower valve body, disabling the passage of air through the valve assembly from the balloon to the port; and in the second position, the disc is against the upper valve body, enabling the passage of air through the valve assembly from the central channel to the balloon.

15. The balloon assembly of claim 13, wherein:

in the first position, the disc is received against the annular seat; and in the second position, the disc is received against the slotted cup.

16. The balloon assembly of claim 13, wherein:

the balloon is fit over the upper valve body;

the upper valve body is fit over the lower valve body; and the lower valve body is fit within the port.

17. The balloon assembly of claim 13, wherein:

the annular seat is formed by an inner flange directed radially inward between the upper and lower ends of the lower valve body;

the slotted cup is formed by a tapered sidewall comprising a plurality of fingers spaced apart by slots, an open bottom inlet, and an open top outlet.

18. The balloon assembly of claim 17, wherein the slotted cup is disposed within an interior of the upper valve body by an endwall extending radially inward from the collar to the slotted cup.

19. The balloon assembly of claim 18, wherein:

the open top outlet of the slotted cup projects above the endwall; and the open bottom inlet of the slotted cup projects below the endwall.

\* \* \* \* \*